Figure 1:
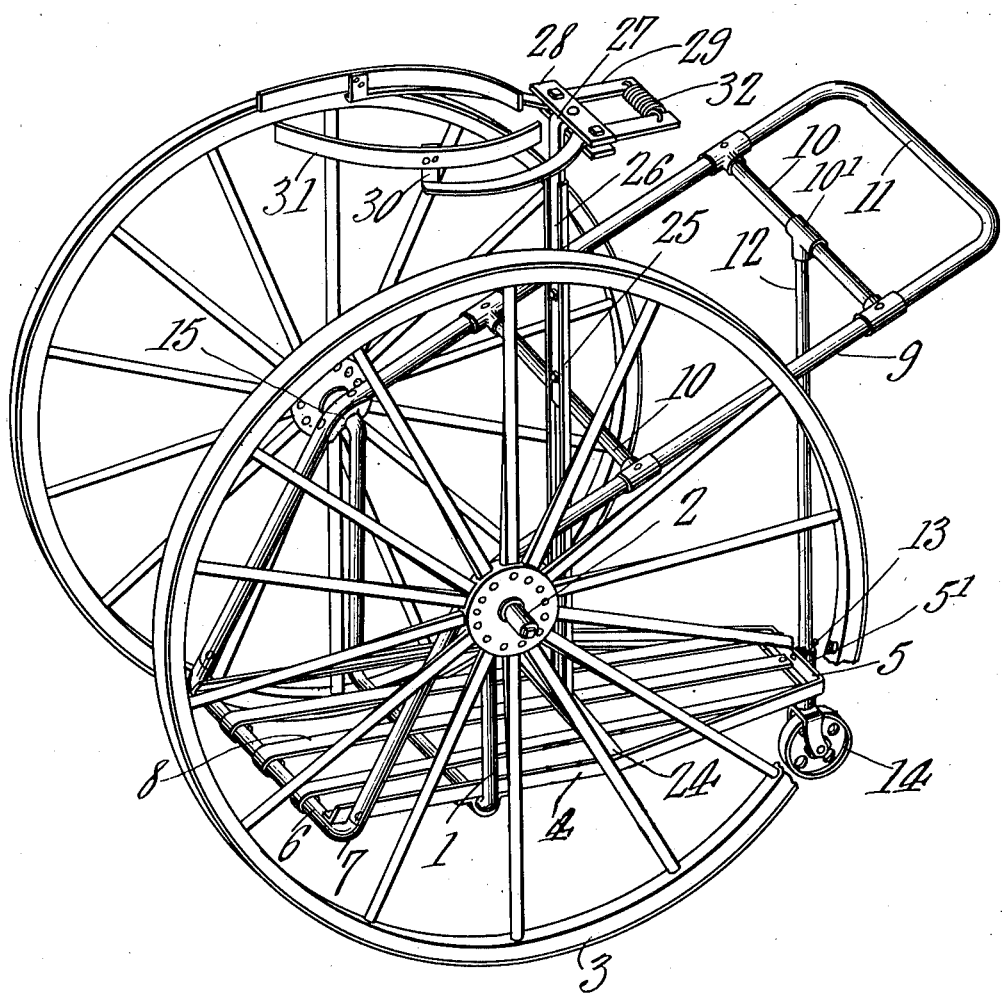

R. D. WIRT.
CART.
APPLICATION FILED JULY 29, 1910.

978,344.

Patented Dec. 13, 1910.

2 SHEETS—SHEET 1.

Reuben D. Wirt,
Inventor

Witnesses by

Attorneys

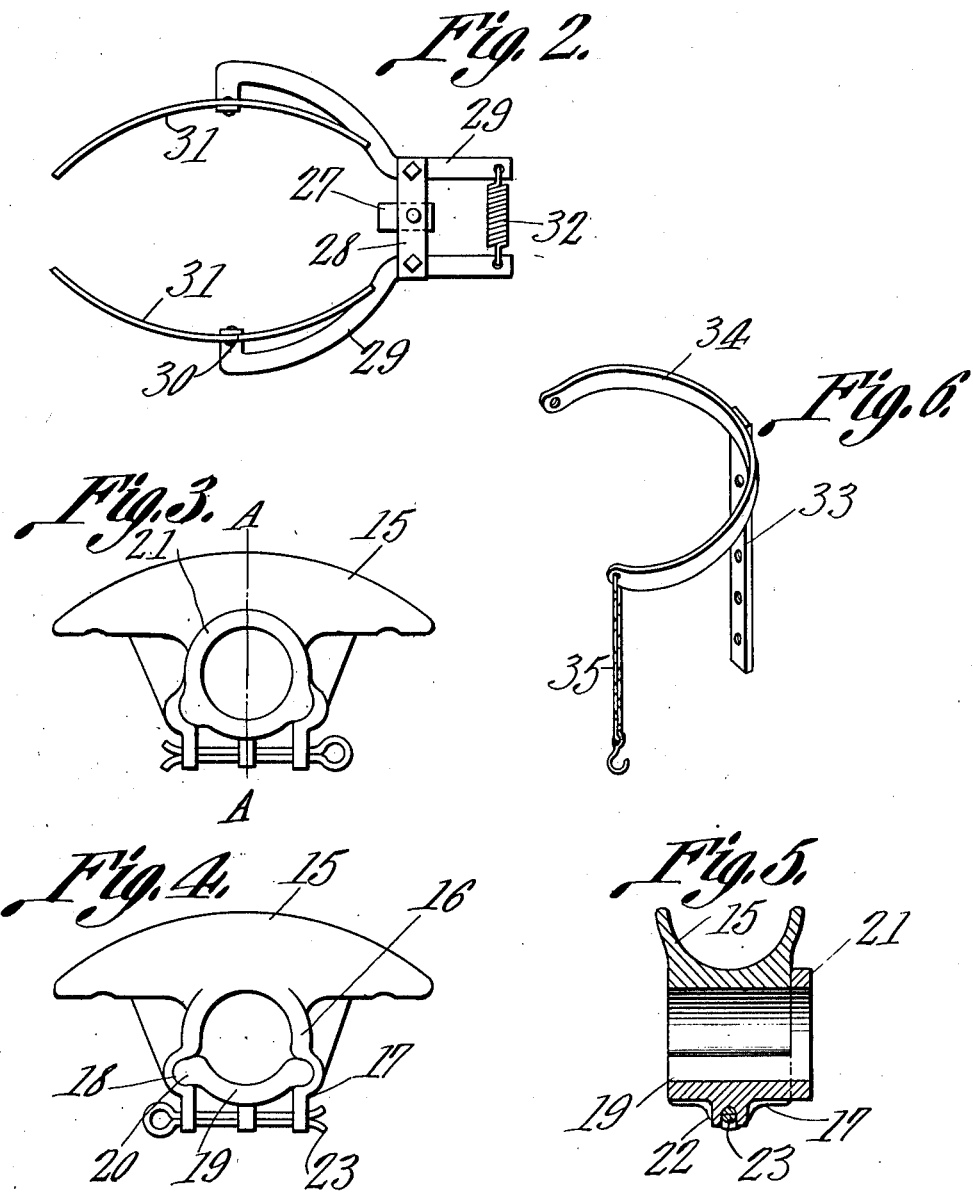

UNITED STATES PATENT OFFICE.

REUBEN D. WIRT, OF PHILADELPHIA, PENNSYLVANIA.

CART.

978,344.

Specification of Letters Patent.  Patented Dec. 13, 1910.

Application filed July 29, 1910.  Serial No. 574,498.

*To all whom it may concern:*

Be it known that I, REUBEN D. WIRT, a citizen of the United States, residing at Philadelphia, in the county of Philadelphia and State of Pennsylvania, have invented a new and useful Cart, of which the following is a specification.

This invention relates to carts of that type commonly employed for holding dirt and rubbish swept up by hand from public thoroughfares.

The object of the invention is to provide an improved form of cart which not only serves to hold a bag or other receptacle for dirt, but also has means for supporting a sprinkling can at a point where it can be conveniently reached by the person using the cart.

A further object is to provide improved means for connecting the handle of the cart to the axle thereof.

A still further object is to provide novel means for supporting a sack or the like upon the cart.

With the foregoing and other objects in view, the invention consists of certain novel details of construction and combinations of parts hereinafter more fully described and pointed out in the claims.

In the accompanying drawings, the preferred form of the invention has been shown.

In said drawings,—Figure 1 is a perspective view of a cart constructed in accordance with the present invention. Fig. 2 is a top plan view of the bag-holder used in connection therewith. Fig. 3 is a side elevation of one of the connections between the handle and the axle. Fig. 4 is an elevation of said connections and showing the opposite sides thereof. Fig. 5 is a section on line A—A Fig. 3. Fig. 6 is a perspective view of a modified form of holder adapted to secure a can or similar receptacle to the cart.

Referring to the drawings by characters of reference 1 designates a bent axle, the trunnions 2 of which are supported by wheels 3. The intermediate portion of the axle supports the angular side strips 4 of the platform of the cart, these side strips converging rearwardly and being connected at their ends by a rear end strip 5, while their front ends are secured to cross rods 6 having upwardly extending terminals 7. Metal strips or slats 8 are secured to the end strips 5 and to the cross rods 6, these strips bearing downwardly on the intermediate portion of the axle and forming the platform. The upwardly extending terminals 7 of the rods 6 project into and are secured within the lower or front ends of tubular side members 9. These members extend over the trunnions 2 close to the inner ends of the hubs of the wheels 3 and extend downwardly and forwardly and upwardly and rearwardly from the trunnions, these members 9 being connected together at intermediate points by cross members 10 and at their upper rear ends by a handle 11 which, as shown in Fig. 1, may be formed integral with the side members 9. The rear cross member 10 has a tee fitting 10' in which the upper end of a stem 12 is mounted for rotation, said stem being revolubly mounted adjacent its lower end within a fitting 5' on the cross strip 5 of the platform. A caster wheel 14 is arranged at the lower end of the stem 12 and coöperates with the wheels 3 to support the platform. The stem 12 may be held against downward movement relative to the fittings 10' and 5', by means of a cotter pin 13 or the like inserted through the stem and bearing downwardly on the fitting 5'.

The means employed for attaching the side members 9 to the trunnions 2 has been illustrated in detail in Figs. 3 and 4. Each of said means includes a saddle 15 shaped to fit snugly against the lower surface of the side member 9 at the bend thereof, said saddle being attached to the member by rivets or the like. A substantially semi-cylindrical extension 16 projects downwardly from the middle portion of the saddle and extends transversely thereof, the sides of this extension being provided with parallel flanges 17 each of which has a longitudinal groove 18 in its inner face. An arcuate bearing plate 19 has ribs 20 along the sides thereof adapted to slip into the grooves 18 and a stop ring 21 is formed at one end of this plate and bears against one end of the extension 16 so as to form a thrust bearing for the hub of the adjacent wheel 3. A forked ear 22 extends downwardly from the plate 19 and is adapted to be engaged by a cotter pin 23 insertible through openings within the flanges 17, this pin thus acting to hold the plate 19 against longitudinal movement with respect to the extension 16.

It is to be understood that the extension 16 bears downwardly on the trunnion 2 of the axle and that the plate 19 extends under said trunnion, this plate and extension thus serving to securely hold the side members 9 to the axle as long as the cotter pin 23 is in position. By removing the cotter pin, the plate 19 can be pushed longitudinally out of the grooves 18, thus permitting the extension 16 to be lifted off of the trunnion.

An angular cross strip 24 is secured above the platform and has a channeled standard 25 secured to the center portion thereof and extending perpendicularly from the platform. This standard is engaged by a post 26 which is adjustably secured therein and has its upper end bent backwardly as at 27 and secured between spaced cleats 28. Curved levers 29 are fulcrumed between the end portions of these plates and the front end of each lever is secured to an ear 30 projecting downwardly from the middle portion of an arcuate jaw 31. The two jaws are oppositely disposed. The rear ends of the levers are connected by a spring 32 which serves to draw said ends toward each other and to keep the jaws 31 normally spread apart.

In using the cart which has been described, a bag is placed with its upper open end between the jaws 31 and opposite portions of the bag are wrapped about the jaws. This is done while said jaws are pressed toward each other. The jaws are then released and the springs 32 will draw them apart so as to cause the folds of the bag to be tightly bound upon the jaws upon which they are wrapped. The bag will thus be supported with its bottom resting on the platform. A watering can may be placed on the rearwardly extending portion of the platform which is located back of the standard 25.

It will be seen that the structure is very simple and compact and will not readily get out of order. The upper or rear cross member 10 not only serves to hold the stem 12 in place, but also constitutes the rack on which empty bags may be hung.

Instead of providing the means shown in Figs. 1 and 2 for holding a bag, a post, such as shown at 33 in Fig. 6, may be adjustably connected to the standard 25, this post being formed with an arcuate spring 34 adapted to embrace the neck portion of a can (not shown) and which is adapted to rest on the platform. A chain 35 is connected to one end of the spring and may be connected to the other end thereof so as to securely attach the spring to the can.

Various changes can of course be made in the construction and arrangement of the parts without departing from the spirit or sacrificing any of the advantages of the invention as defined in the appended claims.

What is claimed is:—

1. A cart including a bent axle, supporting wheels, a platform resting upon the intermediate portion of the axle, a caster supporting one end portion of the platform, and a bag-holder carried by the intermediate portion of the platform, that portion of said platform between the holder and the caster constituting a can support.

2. A cart including a bent axle, supporting wheels, a platform bearing on the axle, a caster constituting a support for one end portion of the platform, said platform including a continuous angular side and end strip, and means for supporting a dirt receptacle upon the front portion of the platform, said platform extending rearwardly beyond said supporting means.

3. A cart including a bent axle, supporting wheels, a platform bearing on the intermediate portion of the axle, a wheel supporting one end portion of the platform, and means upon the platform for supporting a dirt receptacle upon said platform and over the axle, the platform extending beyond the supporting means to constitute a can support.

4. A cart including a wheel supported axle, a platform mounted on the axle, side members connected to one end of the platform and extending over the axle, a connection between the side members, a fitting upon said connection, a fitting secured to the platform, a caster wheel constituting a support for the platform, and a stem projecting from the caster wheel and mounted for rotation within said fittings.

5. A cart including a wheel supported axle, a platform bearing at an intermediate point thereon, side members connected to the axle and attached to one end of the platform, a fitting upon the other end of said platform, a connection between the side members, a fitting carried by said connection, a stem mounted for rotation within the fittings, a caster wheel at the lower end of said wheel and constituting a support for the platform, means engaging the stem and coöperating with one of the fittings to hold the stem against removal from the fittings, said means being detachable.

6. A cart including an axle, supporting wheels, side members bearing on the axle, a handle carried by said members, and movably connected means extending around the axle adjacent each end for detachably securing said members to the axle.

7. A cart including a wheel-supported axle, a platform mounted on the axle, side members connected to the platform and extending over the axle, a handle connected to said members, a bearing element secured to each of said members and resting on the axle, removable bearing elements extending under the axle and detachably engaging the said bearing members, and means for detachably securing said elements to the members.

8. A cart including a wheel-supported axle, side members extending thereover, a handle secured to said members, bearing devices secured to the members and resting on the axle, bearing plates shiftable longitudinally into engagement with said devices and disposed below the axle, and means detachably engaging said devices and members for holding them together and upon the axle.

9. A cart including a wheel-supported axle, side members extending thereacross, a handle connected to the members, a saddle secured to each member, means thereon for embracing the axle, a bearing plate slidable into engagement with said means, and a holding device engaging said means and the plate for detachably securing them about the axle.

10. A cart including a wheel-supported axle, side members extending thereacross, a handle carried by the members, a saddle secured to each member, an extension upon each saddle and engaging the axle, a plate slidable into engagement with the extension and projecting across the axle, and means extending transversely of the plate and extension for detachably securing them together.

11. A cart including a wheel-supported axle, side members extending thereacross, a saddle secured to each member, an extension upon each saddle and embracing the axle, said extension having longitudinal grooves, a plate slidably mounted within the grooves and extending across the axle, means extending transversely of the plate and extension for detachably securing them together, and a thrust bearing integral with the plate.

In testimony that I claim the foregoing as my own, I have hereto affixed my signature in the presence of two witnesses.

REUBEN D. WIRT.

Witnesses:
    ANSON B. EVANS,
    D. H. POWER.